US011878301B2

(12) United States Patent
Lai et al.

(10) Patent No.: US 11,878,301 B2
(45) Date of Patent: Jan. 23, 2024

(54) ANALYSIS CARTRIDGE

(71) Applicant: Credo Diagnostics Biomedical Pte. Ltd., Singapore (SG)

(72) Inventors: Ying-Ta Lai, New Taipei (TW); Yu-Cheng Ou, New Taipei (TW); Jim-Yi Liao, New Taipei (TW); Shu-Hong Huang, New Taipei (TW); Fan-Yun Huang, New Taipei (TW); Ruei-Yi Tsai, New Taipei (TW); Li-Yu Hsiung, New Taipei (TW)

(73) Assignee: Credo Diagnostics Biomedical Pte. Ltd., Singapore (SG)

( * ) Notice: Subject to any disclaimer, the term of this patent is extended or adjusted under 35 U.S.C. 154(b) by 162 days.

(21) Appl. No.: 17/545,956

(22) Filed: Dec. 8, 2021

(65) Prior Publication Data

US 2022/0388000 A1 Dec. 8, 2022

(30) Foreign Application Priority Data

Jun. 7, 2021 (TW) ................................ 110120577

(51) Int. Cl.
*B01L 3/00* (2006.01)

(52) U.S. Cl.
CPC ... *B01L 3/502738* (2013.01); *B01L 3/502707* (2013.01); *B01L 3/502753* (2013.01);
(Continued)

(58) Field of Classification Search
None
See application file for complete search history.

(56) References Cited

U.S. PATENT DOCUMENTS

| | | | |
|---|---|---|---|
| 6,156,576 | A | 12/2000 | Allbritton |
| 6,251,615 | B1 | 6/2001 | Oberhardt |
| 6,783,736 | B1 | 8/2004 | Taylor |
| 10,427,155 | B2 | 10/2019 | Aravanis |

(Continued)

FOREIGN PATENT DOCUMENTS

| | | | |
|---|---|---|---|
| CA | 2 653 038 | A1 | 5/2009 |
| EP | 1 258 720 | A2 | 11/2002 |

(Continued)

OTHER PUBLICATIONS

Ramdayalan Kumarasami et al., iQPrep Kit: A milli-fluidic test kit for immunodiagnostics. 2020 IEEE International Symposium on Medical Measurements and Applications, IEEE, Jun. 1, 2020, pp. 1-6 , Jun. 1, 2020.

(Continued)

*Primary Examiner* — Lore R Jarrett
(74) *Attorney, Agent, or Firm* — Winston Hsu

(57) ABSTRACT

An analysis cartridge includes a first cover, a second cover, a plurality of containers, a plurality of fluid tunnels and a rotary valve. The second cover has two opposite surfaces, a plurality of first through holes and a second through hole individually penetrate through the two opposite surfaces, and the first cover is attached to the second cover. The plurality of containers are disposed between the first cover and the second cover, with each of the containers being aligned to and filled in the first through holes. The plurality of the fluid tunnels are disposed on the first cover, and each of which is individually connected with a first pipette. The rotary valve is rotatably disposed between the first cover and the second cover to correspond to the second through hole, and a flow channel disposed on the rotary valve is connected with the containers individually.

17 Claims, 10 Drawing Sheets

(52) U.S. Cl.
CPC .................. *B01L 2300/0858* (2013.01); *B01L 2300/0883* (2013.01); *B01L 2300/0887* (2013.01); *B01L 2400/043* (2013.01); *B01L 2400/0644* (2013.01)

(56) References Cited

U.S. PATENT DOCUMENTS

| | | | | |
|---|---|---|---|---|
| 10,625,259 | B1 | 4/2020 | Jones | |
| 10,820,847 | B1 | 11/2020 | Andeshmand | |
| 2009/0075390 | A1 | 3/2009 | Linder | |
| 2016/0186240 | A1 | 6/2016 | Andreyev | |
| 2016/0215254 | A1 | 7/2016 | Meldrum | |
| 2018/0185842 | A1 * | 7/2018 | Drews | G01N 35/1002 |
| 2018/0298324 | A1 | 10/2018 | Takeda | |
| 2019/0022644 | A1 | 1/2019 | Shin | |
| 2019/0032114 | A1 | 1/2019 | Trivedi | |
| 2019/0193080 | A1 * | 6/2019 | Lai | C12Q 1/6851 |
| 2020/0023367 | A1 * | 1/2020 | Weber | B01L 9/52 |
| 2020/0190561 | A1 | 6/2020 | Guy | |
| 2020/0206737 | A1 | 7/2020 | Bohm | |

FOREIGN PATENT DOCUMENTS

| | | | |
|---|---|---|---|
| EP | 2 842 628 | A1 | 3/2015 |
| JP | 2010-8217 | A | 1/2010 |
| JP | 2020-530102 | A | 10/2020 |
| KR | 10-1768065 | B1 | 8/2017 |
| TW | 201821784 | A | 6/2018 |
| TW | M597295 | U | 6/2020 |
| WO | 2009/072332 | A1 | 6/2009 |
| WO | 2015/084458 | A2 | 6/2015 |
| WO | 2015/187868 | A2 | 12/2015 |
| WO | 2017/029494 | A1 | 2/2017 |
| WO | 2019/094784 | A1 | 5/2019 |

OTHER PUBLICATIONS

Huan Xu et al., An ultraportable and versatile point-of-care DNA testing platform. Science advances, Apr. 22, 2020, vol. 6, Issue 17, pp. 1-10 , Apr. 22, 2020.

Lai, the specification, including the claims, and drawings in the U.S. Appl. No. 17/364,868, filed Jun. 30, 2021.

Hsuan-Hong Lai et al., Characterization and use of laser-based lysis for cell analysis on-chip, J. R. Soc. Interface (2008) 5, doi: 10.1098/rsif.2008.0177.focus, Jun. 26, 2008, pp. S113-S121, XP055888279.

Qihui Fan et al., Localized Single-Cell Lysis and Manipulation Using Optothermally-Induced Bubbles, Micromachines 2017, 8, 121; doi: 10.3390/mi8040121, MDPI, Apr. 11, 2017, pp. 1-13, XP055888192.

* cited by examiner

ANALYSIS CARTRIDGE

CROSS REFERENCE TO RELATED APPLICATION

This application claims the benefit of Taiwan Patent Application 110120577, filed on Jun. 7, 2021, at the Taiwan Intellectual Property Office, the disclosures of which are incorporated herein in their entirety by reference.

BACKGROUND OF THE INVENTION

1. Field of the Invention

The present disclosure generally relates to an analysis cartridge, and more particularly, to an analysis cartridge for nucleic acid extraction and nucleic acid amplification.

2. Description of the Prior Art

Nucleic acid extraction and nucleic acid amplification are common technologies used in biomedical testing or diagnosis. Generally, a nucleic acid extraction kit or a nucleic acid extraction reagent are usually used in open and routine laboratories for nucleic acid extraction, followed by using a nucleic acid amplification kit or a nucleic acid amplification reagent to amplify specific nucleic acid fragments or detect specific nucleic acid fragments. However, the aforementioned kits or reagents are usually required manual operation, which is time-consuming and easy to result in contamination on samples or reagents, thereby being less efficiency in use on mass testing or production line mode testing.

Therefore, it is still necessary to the related arts to provide a novel and improved kit, reagent or device for nucleic acid extraction and nucleic acid amplification, so as to meet the practical requirements of the related arts.

SUMMARY OF THE INVENTION

One of the objectives of the present disclosure provides an analysis cartridge, in which the connections between the rotary valve and each container may be controlled by rotating the rotary valve to a specific orientation through an external drive force, and then, samples, reagents, reaction solutions and other fluids may be transferred and mixed among the containers on demand with the volume thereof being precisely controlled as well, so as to facilitate the progress of each reaction step. The analysis cartridge of the present disclosure enables to provide an automatic testing process of sample-in result-out, thereby improving the limitations and poor efficacy of the routine laboratories and enhancing the testing efficiency and sensitivity.

In addition, the multi-functional analysis cartridge of the present disclosure further uses magnetic beads to extract nucleic acid, and also improves the structures of the containers and the pipettes, so as to increase the efficiency of absorbing, discharging or transferring magnetic beads, and to improve the extraction efficiency and purity. Meanwhile, the present disclosure effectively reduces the assembly difficulty of plural detailed components, simplifies the fabrication process of the entire analysis cartridge, and also effectively improves the yield and convenience thereof. Therefore, the novel analysis cartridge of the present disclosure is allowable to meet the practical requirements of medical testing or detection products.

To achieve the purpose described above, one embodiment of the present disclosure provides an analysis cartridge including a first cover, a second cover, a plurality of containers, a plurality of fluid tunnels and a rotary valve. The second cover is attached to the first cover, wherein the second cover includes two opposite surfaces and a plurality of first through holes and one second through hole disposed thereon, and the first through holes and the second through hole individually penetrate through the two surfaces. The containers are sandwiched between the first cover and the second cover, with the containers individually being in alignment with the first through holes. The fluid tunnels are disposed on the first cover, and each of which is connected to a first pipette. The rotary valve is rotatably disposed between the first cover and the second cover to align with the second through hole, wherein the rotary valve includes a flow channel disposed thereon to connect to the individual containers.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 to FIG. 6 are schematic diagrams illustrating an analysis cartridge according to a first embodiment in the present disclosure, wherein:

FIG. 1 shows an exploded view of the analysis cartridge according to the first embodiment in the present disclosure;

FIG. 2 shows a top view of the analysis cartridge according to the first embodiment in the present disclosure;

FIG. 3 shows a cross-sectional view of a container of the analysis cartridge according to the first embodiment in the present disclosure;

FIG. 4 shows an exploded view of a rotary valve of the analysis cartridge according to the first embodiment in the present disclosure;

FIG. 5 shows a cross-sectional view of a pipette of the analysis cartridge according to the first embodiment in the present disclosure; and FIG. 6 shows a cross-sectional view illustrating the usages of a short pulse laser beam to break cells in a fluid tunnel of the analysis cartridge according to the first embodiment in the present disclosure.

FIG. 7 to FIG. 10 are schematic diagrams illustrating an analysis cartridge according to a second embodiment in the present disclosure, wherein:

FIG. 7 shows an exploded view of the analysis cartridge according to the second embodiment in the present disclosure;

FIG. 8 shows a top view of the analysis cartridge according to the second embodiment in the present disclosure;

FIG. 9 shows an exploded view of a rotary valve of the analysis cartridge according to the second embodiment in the present disclosure; and FIG. 10 shows a partial cross-sectional view of the rotary valve and a pipette of the analysis cartridge according to the second embodiment in the present disclosure.

DETAILED DESCRIPTION

Figure 1:
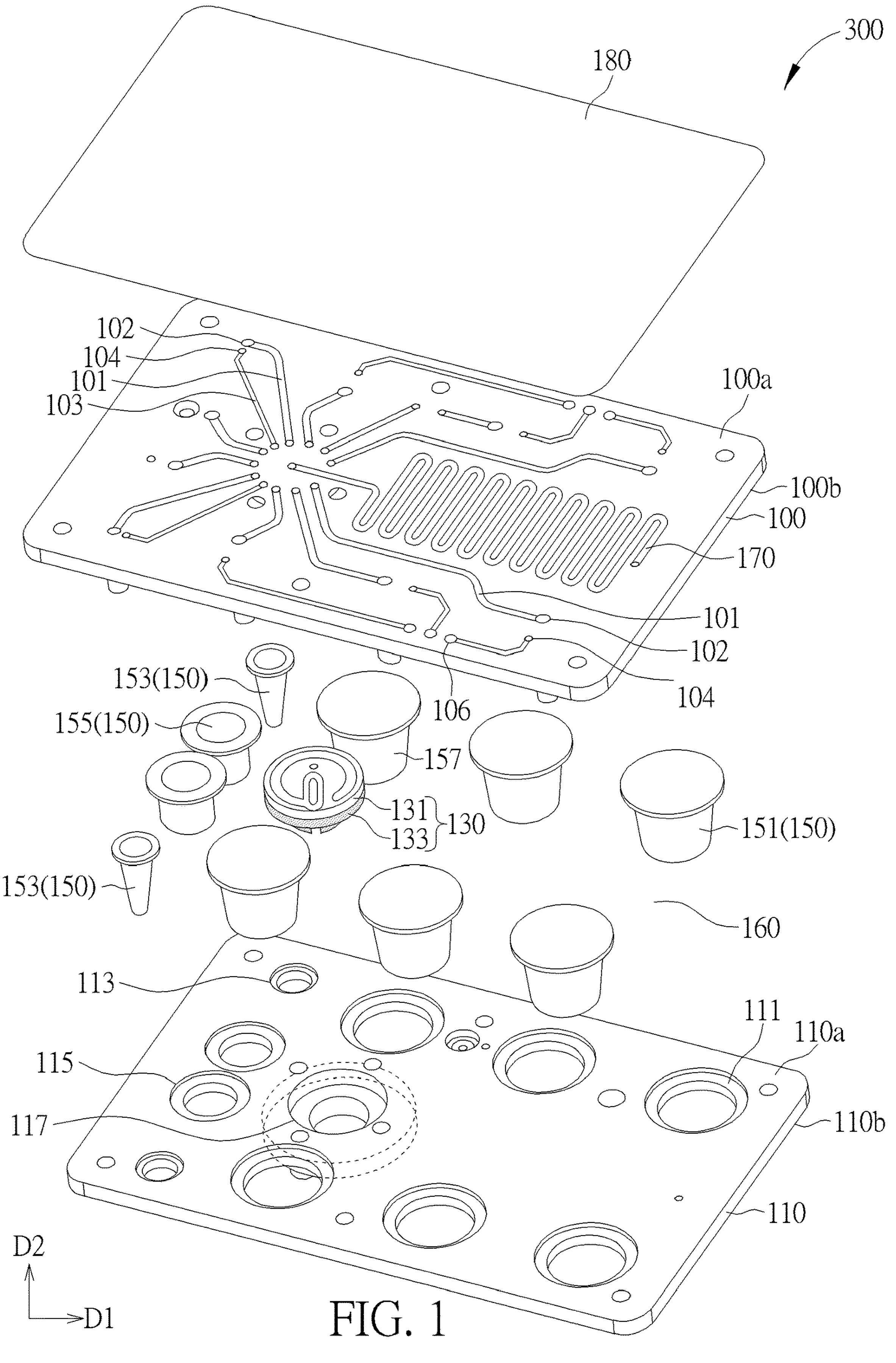

To provide a better understanding of the presented disclosure, preferred embodiments will be described in detail.

The preferred embodiments of the present disclosure are illustrated in the accompanying drawings with numbered elements.

In the present disclosure, the formation of a first feature over or on a second feature in the description may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Furthermore, spatially relative terms, such as "beneath," "below," "lower," "over," "above," "upper" and the like, may be used herein for ease of description to describe one element or feature's relationship to another element (s) or feature (s) as illustrated in the figures. The spatially relative terms are intended to encompass different orientations of the device in use or operation in addition to the orientation depicted in the figures. For example, if the device in the figures is turned over, elements described as "below" and/or "beneath" other elements or features would then be oriented "above" and/or "over" the other elements or features. The apparatus may be otherwise oriented (rotated 90 degrees or at other orientations) and the spatially relative descriptors used herein may likewise be interpreted accordingly.

It is understood that, although the terms first, second, third, etc. may be used herein to describe various elements, components, regions, layers and/or sections, these elements, components, regions, layers and/or sections should not be limited by these terms. These terms maybe only used to distinguish one element, component, region, layer and/or section from another region, layer and/or section. Terms such as "first," "second," and other numerical terms when used herein do not imply a sequence or order unless clearly indicated by the context. Thus, a first element, component, region, layer and/or section discussed below could be termed a second element, component, region, layer and/or section without departing from the teachings of the embodiments.

As disclosed herein, the term "about" or "substantial" generally means within 20%, preferably within 10%, and more preferably within 5%, 3%, 2%, 1%, or 0.5% of a given value or range. Unless otherwise expressly specified, all of the numerical ranges, amounts, values and percentages disclosed herein should be understood as modified in all instances by the term "about" or "substantial". Accordingly, unless indicated to the contrary, the numerical parameters set forth in the present disclosure and attached claims are approximations that can vary as desired.

Figure 2:
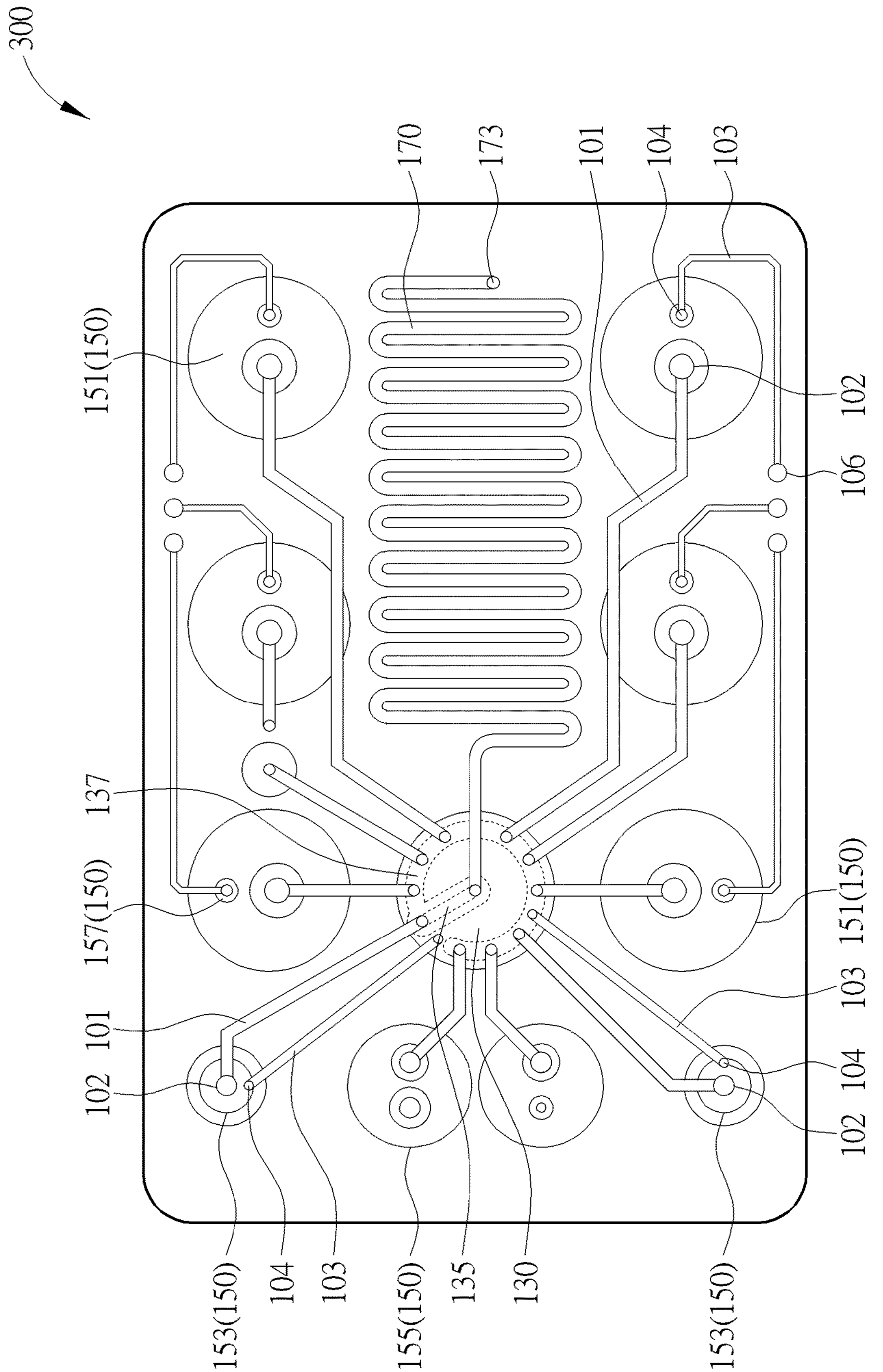
Figure 4:
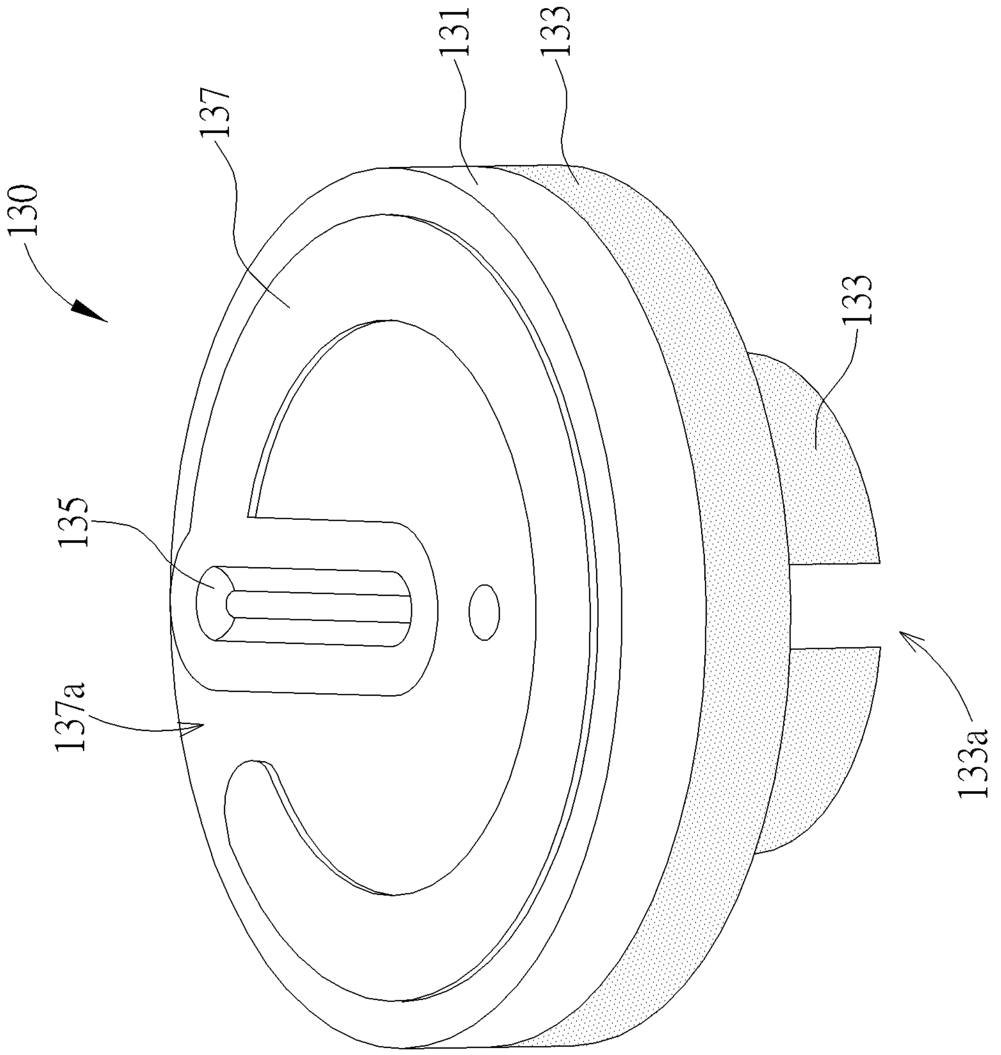
Figure 5:
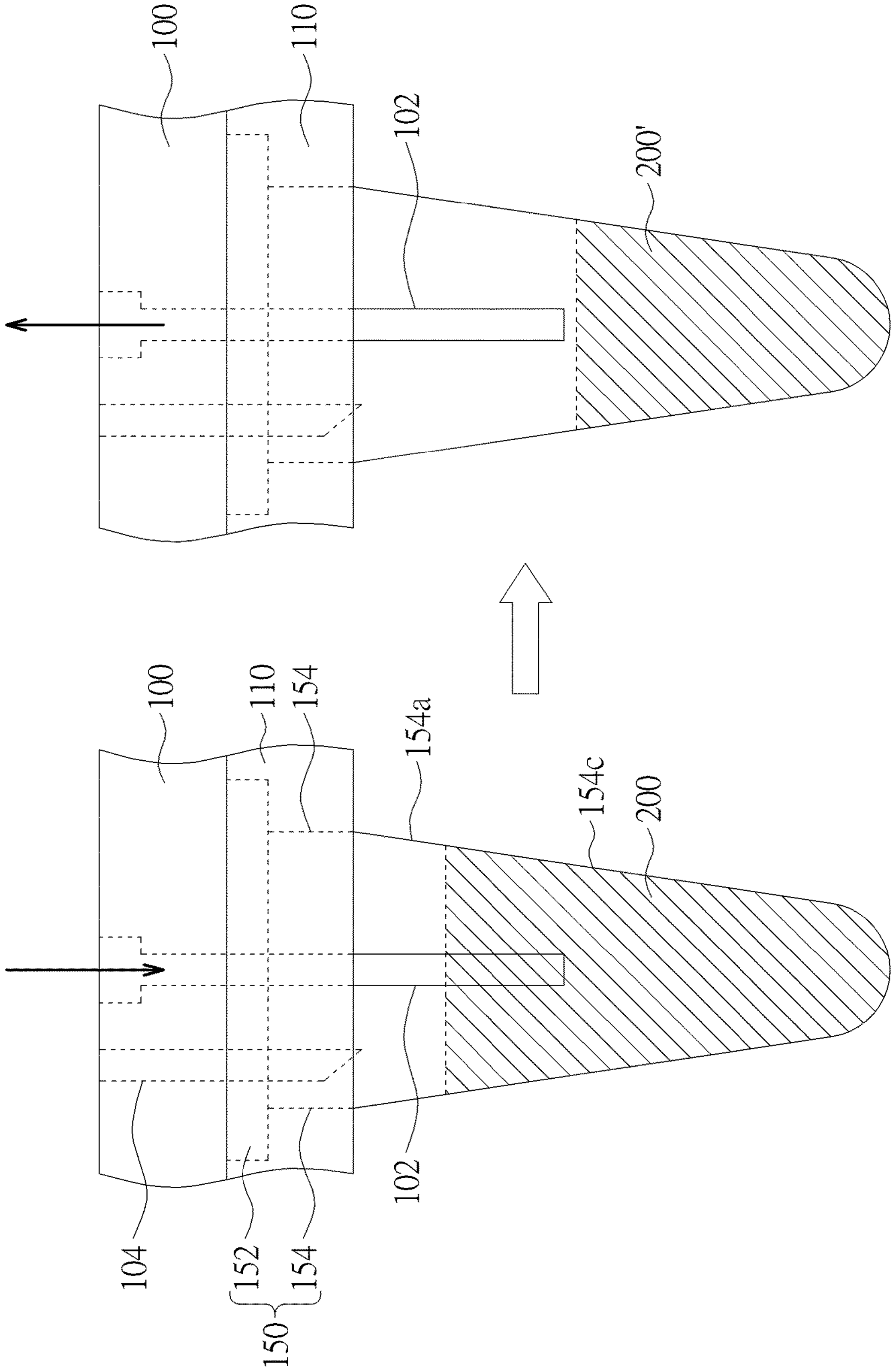
Figure 6:
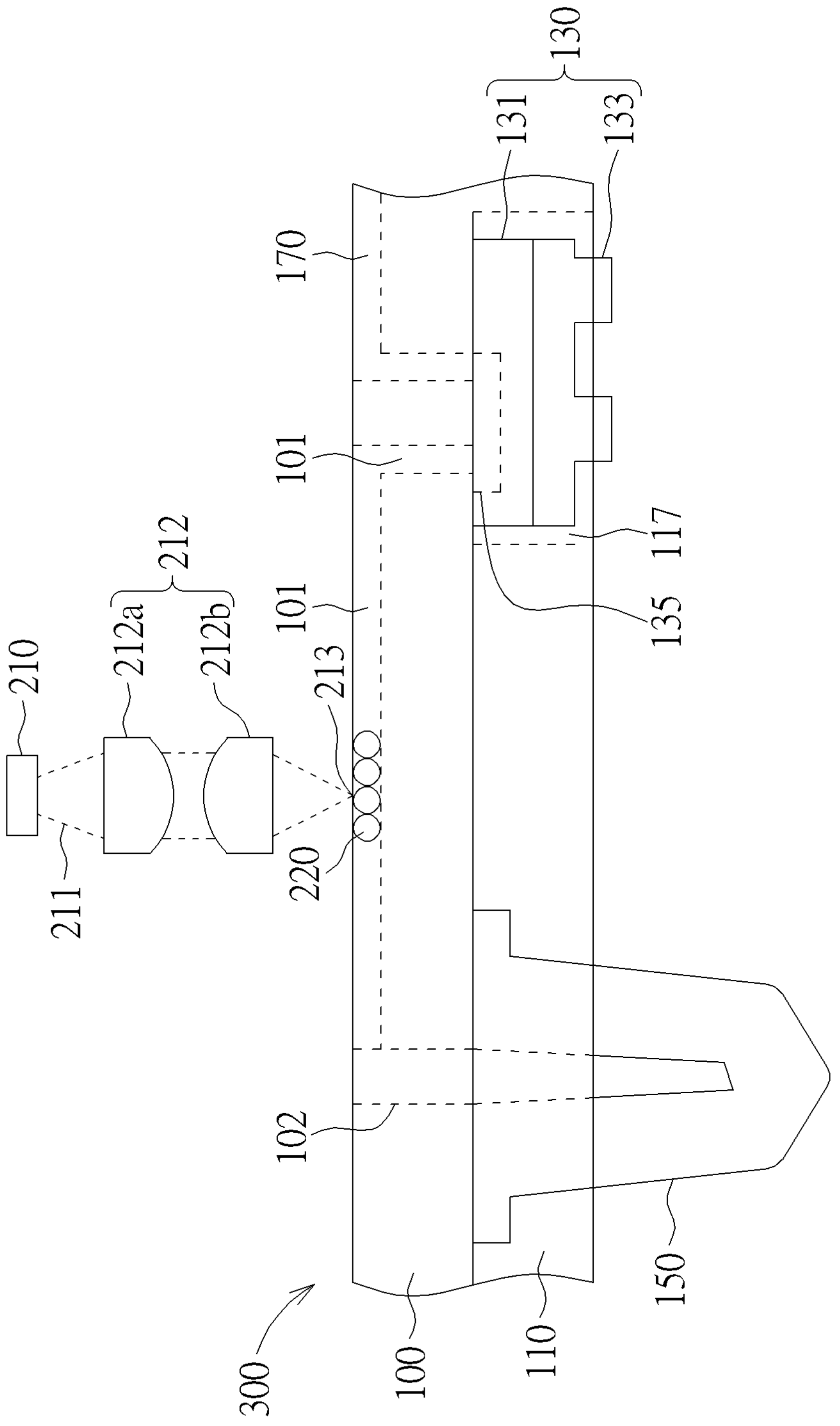

Please refers to FIGS. 1-6, which illustrate an analysis cartridge 300 according to the first embodiment of the present disclosure, wherein FIG. 1 is a schematic diagrams of an exploded view of the analysis cartridge 300, FIG. 2 is a schematic diagram of a top view of the analysis cartridge 300, FIG. 6 is a schematic diagram of an operation of the analysis cartridge 300, and the rest drawings are schematic diagrams of a stereo view or a cross-sectional view showing the detailed components of the analysis cartridge 300. As shown in FIG. 1 and FIG. 2, the analysis cartridge 300 includes a first cover 100, a second cover 110 and a rotary valve 130. The first cover 100 for example includes two opposite surfaces, such as the first surface 100*a* and the second surface 100*b* as shown in FIG. 1, and the second cover 110 also includes two opposite surfaces, such as the first surface 110*a* and the second surface 110*b* as shown in FIG. 1. The second surface 100*b* of the first cover 100 faces to the first surface 110*a* of the second cover 110. While the analysis cartridge 300 is not yet assembled, the second cover 110 and the first cover 100 are separated from each other to define an accommodation space 160 (as shown in FIG. 1) therebetween, wherein the rotary valve 130, a plurality of containers 150 and other components maybe disposed within the accommodation space 160. While assembling the analysis cartridge 300, the second surface 110*b* of the first cover 100 is attached to the first surface 110*a* of the second cover 110, and the rotary valve 130, the containers 150 and other components are all sandwiched between the second cover 110 and the first cover 100 with the accommodation space 160 being no longer existed, as shown in FIG. 2. In one embodiment, the first cover 100 and the second cover 110 are assemble for example through a thermal melting method or an ultrasonic method, so as to improve the reliability and malleability of the analysis cartridge 300, but not limited thereto.

Each of the first cover 100 and the second cover 110 for example includes a flat plate extending along a horizontal direction (such as the x-direction, as shown in the direction D1 in FIG. 1), and may be formed by a plastic injection molding method using the adequate material selected from the group including polypropylene (PP), polycarbonate (PC), polyimide (PI), polyethylene terephthalate (PET) and others having thermoplasticity and biocompatibility, but is not limited thereto. Also, the first cover 100 and the second cover 110 may have a mutually corresponding contour, for example, both are a rectangular shape, as shown in FIG. 1, but are not limited thereto. People skilled in the art should easily understand that the specific contour of the first cover 100 and the second cover 110 shown in FIG. 1 is only exemplary, and the first cover 100 and the second cover 110 may further include other applicable shapes based on practical product requirements.

Figure 3:
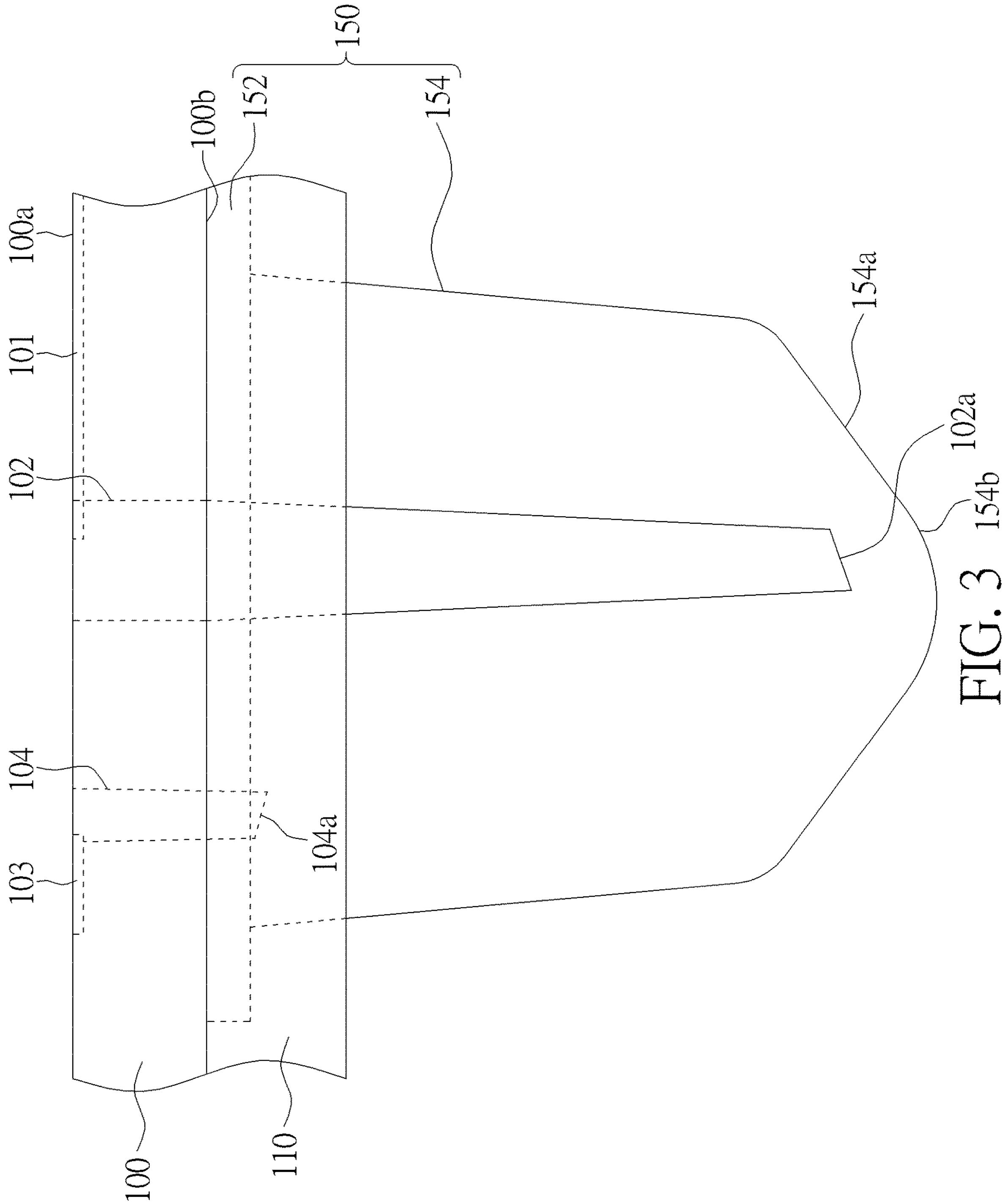

Precisely speaking, the first cover 100 further includes a plurality of fluid tunnels 101 and a plurality of gas tunnels 103 disposed on the first surface 100*a*. In the present embodiment, each of the fluid tunnels 101 and each of the gas tunnels 103 for example extends laterally along any direction which is parallel to the direction D1, to connect to a pipette 102 or a gas hole 104 for fluid circulation or gas circulation. One end of each gas tunnel 103 is connected to the gas hole 104, and the other end thereof is connected to a vent 106 disposed on the first cover 100 for exhausting air. Please also refers to FIG. 3, each of the pipettes 102 and each of the gas holes 104 are a hollow structure extended downwardly from the first surface 100*a* of the first cover 100 to protrude from the second surface 100*b* of the first cover 100. In one embodiment, the bottom portions of the pipette 102 and the gas hole 104 preferably include inclined sidewalls 102*a*, 104*a* respectively, as shown in FIG. 3, but not limited thereto. The inclined sidewall 102*a* of the pipettes 102 may improve the problem that liquid is easy to remain in the pipettes 102 while sucking liquid, and may also facilitate to punch through the sealing film during assembling. In another embodiment, the inclined sidewalls of the pipettes and the gas holes may also be optionally omitted (not shown in the drawings). Furthermore, due to the practical product requirements, the fluid tunnels and/or the gas tunnels may further have different extending directions, for example being extended along any direction which is perpendicular to the direction D1 (such as the direction D2), or are situated at different locations, and which is not limited to be the aforementioned types.

A plurality of through holes 111, 113, 115 are further disposed on the second cover 110, to penetrate through the first surface 110*a* and the second surface 110*b* sequentially, wherein each of the through holes 111, 113, 115 may have different sizes (e.g. different aperture sizes), so as to accommodate a plurality of containers 150 (e.g. the containers 151, 153, 155 as shown in FIGS. 1 and 2) with different sizes, but not limited thereto. In other words, the practical size of each through hole may be diverse by the size of each container, and the practical size of each container may be diverse based on the actual product requirements, and which is not limited to those shown in FIGS. 1-2, which may be easily understood by those skilled in the art. As shown in FIG. 3, each of the containers 150 includes a hollow main body 154 for accommodating various desired reagents based on practical product requirements, and the main body 154 is sealed by a film 152 for example including a material like aluminum foil or plastic. Preferably, the main body 154 includes an inclined portion 154*a* for facilitating to concentrate various reagents disposed within the container 150. The inclined portion 154*a* may include an inclined sidewall 154*b*, which is for example disposed at least at the bottom of the main body 154, as shown in FIG. 3, but not limited thereto. In another embodiment, the main body 154 may optionally include an inclined sidewall 154*c* as a whole, as shown in FIG. 5.

In one embodiment, the containers 150 for example include a plurality of reagent containers 151, at least one reaction container 153 and least one sample container 155, with each of the reagent containers 151 individually accommodating a cleaning reagent, a buffer, an eluent, a lysate or the like, with the at least one reaction container 153 accommodating various enzymes or reactants (such as primers or probes) for performing the reaction, and with the at least one sample container 155 accommodating various samples such as bacteria, cells or virus or samples suspected of carrying bacteria, cells or viruses and required the nucleic acid extraction and the nucleic acid amplification for confirmation. The quantity of the reaction containers 153 may be any suitable number, for example may be two as shown in FIG. 1. Then, the analysis cartridge 300 may perform different amplification and testing reaction at the same time through the two reaction containers 153, based on various primers and/or probes disposed therein, but is not limited thereto. People skilled in the art should easily understand that, in other embodiments, a single reaction container or more reaction containers may also be optionally disposed in the analysis cartridge, for achieving different testing requirements. In addition, the containers 150 may further include an extraction container 157 having a plurality of magnetic beads (not shown in the drawings) disposed therein, and the magnetic beads may be combined with the testing sample at the beginning of the testing for purification.

It is noted that, the pipettes 102 and the gas holes 104 disposed on the first cover 100 are in alignment with the through holes 111, 113, 115 disposed on the second cover 110, so that, the pipettes 102 and the gas holes 104 disposed on the first cover 100 may punch through the film 152 of each container 150 disposed within each through holes 111, 113, 115 by using the inclined sidewalls 102*a*, 104*a* thereof, during assembling the analysis cartridge 300, as shown in FIG. 3. Preferably, the pipettes 102 disposed on the first cover 100 may further extend into the bottom of the containers 150 after penetrating through the films 152 of the containers 150, more preferably, being extended to the portion closed to the inclined portion 154*a*; and the gas holes 104 disposed on the first cover 100 may be located at the top portion of the containers 150, right located at the portion just penetrating through the films 152, as shown in FIG. 3, but not limited thereto.

On the other hand, a through hole 117 is further disposed on the second cover 110, for accommodating the rotary valve 130 to rotate therein. Precisely speaking, the rotary valve 130 is for example consisted of a soft material in combined with a hard material, in order to improve the airtightness of the rotary valve 130 after being combined with the first cover 100 and the second cover 110. As shown in FIG. 4, the rotary valve 130 includes a first portion 131 and a second portion 133 stacked from top to bottom, wherein the first portion 131 for example includes thermoplastic polyurethanes (TPU), rubber, polyurethane material, polyethylene, polyethylene terephthalate (PET), thermoplastic polyester elastomer (TPEE), biocompatible resin, or a combination thereof, and the second portion 133 includes a rigid material different from that of the first portion 131, such as polypropylene fiber, polycarbonate, or the like, but not limited thereto. In this way, when the analysis cartridge 300 is assembled, the first portion 131 of the rotary valve 130 may be attached to the second surface 100*b* of the first cover 100, and the second portion 133 of the rotary valve 130 may be installed in the through hole 117, thereby achieving an airtight assembly manner.

In the present embodiment, the first portion 131 of the rotary valve 130 further includes a protrusion 137, with the protrusion 137 surrounding a flow channel 135 and forming an opening 137*a*, and the second portion 133 of the rotary valve 130 includes an engagement 133*a*. The flow channel 135 may include any suitable shape, for example the straight shape as shown in FIG. 4, but is not limited thereto. In this way, after the analysis cartridge 300 is assembled, the second portion 133 (including the engagement 133*a*) of the rotary valve 130 may be protruded into the through hole 117 of the second cover 110, to further externally connect to a motor (not shown in the drawings), with the motor driving and controlling the rotary valve 130 within the analysis cartridge 300 to rotate. In other words, the rotary valve 130 may be rotatably disposed between the first cover 100 and the second cover 110. With such arrangements, one end of the flow channel 135 may be connected to different fluid tunnels 101 in sequence through the rotation of the rotary valve 130, when the opening 137*a* may be aligned to the gas holes 104 at the same time. While the rotary valve 130 further connects to a pump (not shown in the drawings) externally through a liquid temporary storage region 170, the various reagents within each container 150 may be sucked out, discharged, or transferred through a positive pressure or a negative pressure provided by the pump. In the present embodiment, the analysis cartridge 300 further includes the liquid temporary storage region 170 for example disposed on the first surface 100*a* of the first cover 100. As shown in FIG. 1 and FIG. 2, the liquid temporary storage region 170 may include a hollow tubular structure in a snaked shape or a continuously curved shape, wherein one end of the liquid temporary storage region 170 may be connected to another end of the flow channel 135, and another end of the liquid temporary storage region 170 may further include a pump connector 173 for externally connecting to the pump. Accordingly, the liquid temporary storage region 170 of the analysis cartridge 300 may be used to temporarily store the sucked-out reagent, so as to assist to suck, discharge or transfer the reagents.

Moreover, the analysis cartridge 300 may further include a flat film-shaped material (for example a sealing layer 180 as shown in FIG. 1) attached to the first surface 100*a* of the first cover 100 to seal the fluid tunnels 101, the gas tunnels 103 and the liquid temporary storage region 170 into closed channels.

In a preferably embodiment, the analysis cartridge 300 may be used in nucleic acid extraction and nucleic acid amplification, but is not limited thereto. For example, through rotating the rotary valve 130 to a specific orientation, the sample disposed within the sample container 155 may be firstly transferred to one of the reagent containers 151 to rupture or to open the cells of the sample using a chemical method, followed by rotating the rotary valve 130 again to transfer the sample containing the ruptured or opened cells and the released substances thereof to the extraction container 157. The sample containing the ruptured or opened cells and the released substances thereof are combined with the magnetic beads within the extraction container 157 for purification. Then, the sample combined with the magnetic beads is further transferred to another reagent container 151 for washing, and finally, the desired biomaterial such as nucleic acid is eluted from the magnetic beads, for performing the subsequent testing. Subsequently, the biomaterial is also transferred to the reaction container 153 through the rotary valve 130 to carry out the desired reaction. If the reaction container 153 contains the lyophilized primer pair, nitrogenous bases and nucleic acid polymerase, and a polymerase chain reaction may be carried out after the biomaterial is injected into the reaction container 153, but the reaction is not limited thereto. In another embodiment, the reaction container 153 may optionally contain other enzymes or reagents, to carry out other reaction such as probe conjugation or enzymatic conjugation based on the product requirements. It is noted that, while transferring the aforementioned sample or biomaterial, the length of the pipettes 102 extended into each container 150 may be used to quantify the fluid. Precisely speaking, as shown in FIG. 5, while a fluid (such as the aforementioned sample or biomaterial) 200 is injected into the container 150, the fluid 200 having an initial liquid level may cover the pipettes 102 to reach a specific height (as shown in the left panel of FIG. 5). Next, the fluid 200 is sucked out to result in the liquid level lowered and to leave the fluid 200', and the bottom of the pipettes 102 may no longer be covered by the fluid 200' (as shown in the right panel of FIG. 5). Accordingly, the sucked-out volume of the fluid 200 may be accurately controlled, and it may be further confirmed using the volume of the fluid 200' remained in the container 150. In other words, the specific liquid level is depended upon the desired volume of the fluid 200. When the larger volume of the fluid 200 to be sucked is desired, it may select the pipettes 102 that may extend into the container 150 deeper or the container 150 having a shorter length. When the smaller volume of the fluid 200 to be sucked is desired, it may select the pipettes 102 that may extend into the container 150 shallower (for example the pipette is extended into a half depth of the container 150 or is closed to the top of the container 150), or the container 150 having a longer length. In this way, the depth of the pipettes 102 extended into each container 150 may be adjusted according to the practical requirements of the testing, so as to quantify the transferred amount of the fluid.

Moreover, it is also noted that, while transferring the biomaterial to the reaction container 153 through the rotary valve 130, the rotary valve 130 is rotated to make the flow channel 135 thereof to align with the pipette 102 which is extended into the reaction container 153, and to make the opening 137*a* thereof to align with the gas hole 104 which is extended into the reaction container 153. Through these arrangements, the biomaterial maybe successfully injected into the reaction container 153 while the gas tunnel 103 is free for circulation. However, while a reaction is required to be performed in the reaction container 153, the rotary valve 130 may be rotated again to make the pipette 102 and the gas hole 104 which are extended into the reaction container 153 being no longer aligned with the flow channel 135 and the opening 137*a*. Then, the fluid tunnels 101 and the gas tunnels 103 may be closed thereby, so as to prevent the volume of the reactants and fluids disposed within the reaction container 153 from evaporation due to the increased temperature, or to prevent from condensation due to the decreased temperature, which may seriously affect the concentrations of the reactants and fluids. In other words, while the reaction is carried out in the reaction container 153, the pipette 102 and the gas hole 104 extended into the reaction container 153 may be covered by the protrusion 137 disposed on the rotary valve 130, so that the inner space of the reaction container 153 may reach an airtight state, thereby promoting the performance of the reaction.

Accordingly, in a preferable embodiment for nucleic acid extraction and nucleic acid amplification, the rotary valve 130 is rotated to communicate with the liquid temporary storage region 170 through the flow channel 135 thereon, and to communicate with the sample container 155 through the fluid tunnel 101. Meanwhile, the pump is driven to suck out the sample within the sample container 155 to the liquid temporary storage region 170. Next, the rotary valve 130 is rotated again to make one end of the flow channel 135 to communicate with the reagent container 151 (as shown in the upper right corner in FIG. 2) through the fluid tunnel 101, and to make the other end of the flow channel 135 to still communicate with the liquid temporary storage region 170, as the pump is driven to discharge and suck out the sample within the liquid temporary storage region 170 back and forth between the reagent container 151 and the liquid temporary storage region 170. Accordingly, the cells in the sample or the sample suspected to contain cells may be therefore ruptured or opened due to the lysis buffer disposed within the reagent container 151, as well as the physical force caused by the flow among the fluid tunnels 101, the flow channel 135 and the liquid temporary storage region 170, to obtain a first mixture by mixing the lysis buffer and the sample. Then, the rotary valve 130 is rotated again to make the flow channel 135 to communicate with the extraction container 137 through the fluid tunnel 101, with the first mixture temporarily stored in the liquid temporary storage region 170 being discharged into the extraction container 157 through the flow channel 135 and the fluid tunnel 101. The extraction container 157 contains magnetic beads whose surfaces have molecules for binding nucleic acids, and the magnetic beads may capture nucleic acids (if any) in the first mixture to form a nucleic acid-magnetic bead complex. Alternatively, the magnetic beads may not capture nucleic acids if there is no nucleic acid presented in the sample. Likewise, the magnetic beads are fully mixed with the first mixture to form a second mixture through the discharging and sucking out by the pump.

Next, the nucleic acid-magnetic bead complex (or only the magnetic beads if the nucleic acid does not exist) within the second mixture may be adsorbed by using a magnet or magnetic device (not shown in the drawings) placed outside the extraction container 157. The residue of the second mixture is then sucked out and transferred to the liquid temporary storage region 170, and the rotary valve 130 is next rotated to communicate with the used reagent container 151 (as shown in the upper right area of FIG. 2), to further transfer the residue of the second mixture from the liquid temporary storage region 170 to the used reagent container 151 for storage. Preferably, the magnet or the magnetic device is placed at a position far away from the inclined sidewall 102*a* of the pipette 102, so as to prevent the desired nucleic acid-magnetic bead complex from being sucked out from the extraction container 157 and discarded due to pumping suction.

After that, the rotary valve 130 is rotated again to connect to another reagent container 151 containing a cleaning reagent (for example the reagent container 151 disposed below the rotary valve 130 as shown in FIG. 2), and the magnet or the magnetic device is placed far away from the extraction container 157, thereby transferring the cleaning reagent to the liquid temporary storage region 170 and then to the extraction container 157. Accordingly, the nucleic acid-magnetic bead complex is released to mix with the cleaning reagent to form a third mixture. Then, the magnet or the magnetic device is placed again to adsorb the nucleic acid-magnetic bead complex, and the residue of the third mixture is transferred to the reagent container 151 (such as the reagent container 151 in the upper right area of FIG. 2) for storage.

When a buffer is applied, the nucleic acid-magnetic bead complex is also processed through the same steps in the aforementioned paragraph. People in the art should easily understand that, in another embodiment, the nucleic acid-magnetic bead complex may also be treated with the same or different cleaning reagents or buffer disposed in one or more reagent containers 151, so as to improve the extraction efficiency and the purity thereof.

Then, the rotary valve 130 is rotated again to communicate with another reagent container 151 containing an eluent (such the reagent container 151 in the lower right area in FIG. 2), and the magnet or the magnetic device is placed far away from the extraction container 157, followed by firstly transferring the eluent to the liquid temporary storage region 170 and then to the extraction container 157, wherein the eluent may break the bonding between the nucleic acid and the molecules on the surfaces of the magnetic beads, thereby releasing the nucleic acid. Then, the nucleic acid, the magnetic beads and the eluent may therefore form a fourth mixture. The magnet or the magnetic device is placed again to absorb the magnetic beads, and the residue of the fourth mixture (including the nucleic acid and the eluent) is then transferred to the liquid temporary storage region 170, and the rotary valve 130 is rotated again to communicate with the reaction container 153, the flow channel 135 and the liquid temporary storage region 170. It is noted that, the opening 137*a* formed by the semi-closed protrusion 137 of the rotary valve 130 is communicated with the reaction container 153 at this time through the gas tunnel 103 and the gas hole 104, and the residue of the fourth mixture (including the nucleic acid and the eluent) may be injected into the reaction container 153 from the liquid temporary storage region 170 as the gas tunnels 103 are free for circulation. On the other hand, while the reaction is performed within the reaction container 153, the rotary valve 130 is rotated to make the pipette 102 and the gas hole 104 extended into the reaction container 153 being not aligned with the flow channel 135 and the opening 137*a*, thereby blocking the fluid tunnel 101 and the gas tunnel 103.

In addition, the analysis cartridge 300 of the present disclosure enables to simultaneously carry out one or more acid amplification reactions, and an appropriate volume of the residue of the fourth mixture may be dispensed to two or more reaction containers 153. The nucleic acid contained in the residue of the fourth mixture is then amplified by an external instrument (not shown in the drawings) in the presence of a primer pair and/or a probe, deoxynucleoside triphosphate and polymerase, and the external instrument may further identify the sample contains a specific strain of bacteria or not by detecting the signal of the amplified nucleic acid.

In the aforementioned embodiment, cells within the sample are ruptured or opened by the lysis buffer disposed in the reagent container 151 and the physical force imposed back and forth between the flow channels 135, and the sample and the lysis buffer are mixed to form the first mixture, which then is further mixed with the magnetic beads in the extraction container 157 to form the nucleic acid-magnetic bead complex. In another improved embodiment, the sample and the lysis buffer may be transferred to the extraction container 157 individually, and mixed with magnetic beads to form the second mixture. Alternatively, the sample may be firstly mixed with the lysis buffer, and immediately transferred to the extraction container 157, thereby mixing with the magnetic beads to form the second mixture. Then, the second mixture may flow back and forth among the fluid tunnels 101, the flow channel 135 and the liquid temporary storage region 170, so that not only the cells in the second mixture are ruptured or opened due to the physical force and the lysis buffer, but also the nucleic acid released from the cells is captured by the magnetic beads during the mixing process, which may significantly reduce the time for nucleic acid extraction.

Through these arrangements, the analysis cartridge 300 according to the first embodiment of the present disclosure is provided. According to the present embodiment, the rotary valve 130 is rotatably disposed in the analysis cartridge 300, and the external motor is linked with the rotary valve 130 in the analysis cartridge 300 to drive the rotary valve 130 to rotate to any orientation, so that, various fluids such as the sample, the reagents and the reactants disposed in each of the containers 150 may be freely transferred and mixed among the containers 150, and finally transferred to the reaction container 153 for carrying out the reaction. The rotary valve 130 includes the flow channel 135 and the opening 137*a* disposed thereon. While the sample, the reagents and the reactant are sucked out through the rotary valve 130, the rotary valve 130 is rotated to make the flow channel 135 and the opening 137*a* disposed thereon to align with the pipettes 102 and the gas holes 104 which are penetrated into the containers 150, respectively, so as to facilitate the transferring of fluids. On the other hand, while a reaction such as a nucleic acid extraction, a nucleic acid amplification, a cell rupture or cell opening reaction would be carried out in the containers 150, the rotary valve 130 is rotated to make the protrusion 137 thereon directly cover the pipette 102 and the gas hole 104 which are penetrated into the containers 150, thereby enabling the containers 150 to perform like an airtight state to prevent from contamination and to facilitate the reaction. With such arrangements, the analysis cartridge 300 of the present embodiment enables to provide an automated testing process of sample-in result-out, thereby improving the limitations and poor efficacy of the routine laboratories and enhancing the testing efficiency and sensitivity.

People in the art should also fully understand that the analysis cartridge of the present disclosure is not limited to the aforementioned type, and may include other examples or variations. For example, in the aforementioned embodiment, since the sample is processed chemically, a reagent container 151 containing reagent for rupturing or opening cell may be arranged in the analysis cartridge 300. However, in another embodiment, the cells may also be ruptured or opened through other methods such as a laser or an ultrasonic method, and devices for performing laser or ultrasonic cell disruption may be further arranged in the analysis cartridge and used together with an optical lens. For example, as shown in FIG. 6, a laser diode 210 maybe additionally provided, and a short pulse laser beam 211 emitted from the laser diode 210 may pass through an optical lens set 200 (including a light receiving lens 212*a* and a focusing lens 212*b*) and is focused on a focus 213. Then, the biomaterial flows between the liquid temporary storage region 170, the flow channel 135 of the rotary valve 130, the fluid tunnels 101, the pipettes 102, and the containers 151 may be irradiated by the short pulse laser beam 211 when passing through the focus 213, the cells 220 within the biomaterial may be ruptured or opened to release the nucleic acid. However, in another embodiment, the laser diode, the optical lens set or the like may also be disposed in the analysis cartridge, or the optical lens set maybe disposed in the analysis cartridge, with the laser diode being additionally provided for example on an instrument (not shown in the drawings) for accommodating the analysis cartridge.

The following description will detail the different embodiments of the analysis cartridge, and the following description will detail the dissimilarities among the different embodiments and the identical features will not be redundantly described. In order to compare the differences between the embodiments easily, the identical components in each of the following embodiments are marked with identical symbols.

Figure 7:
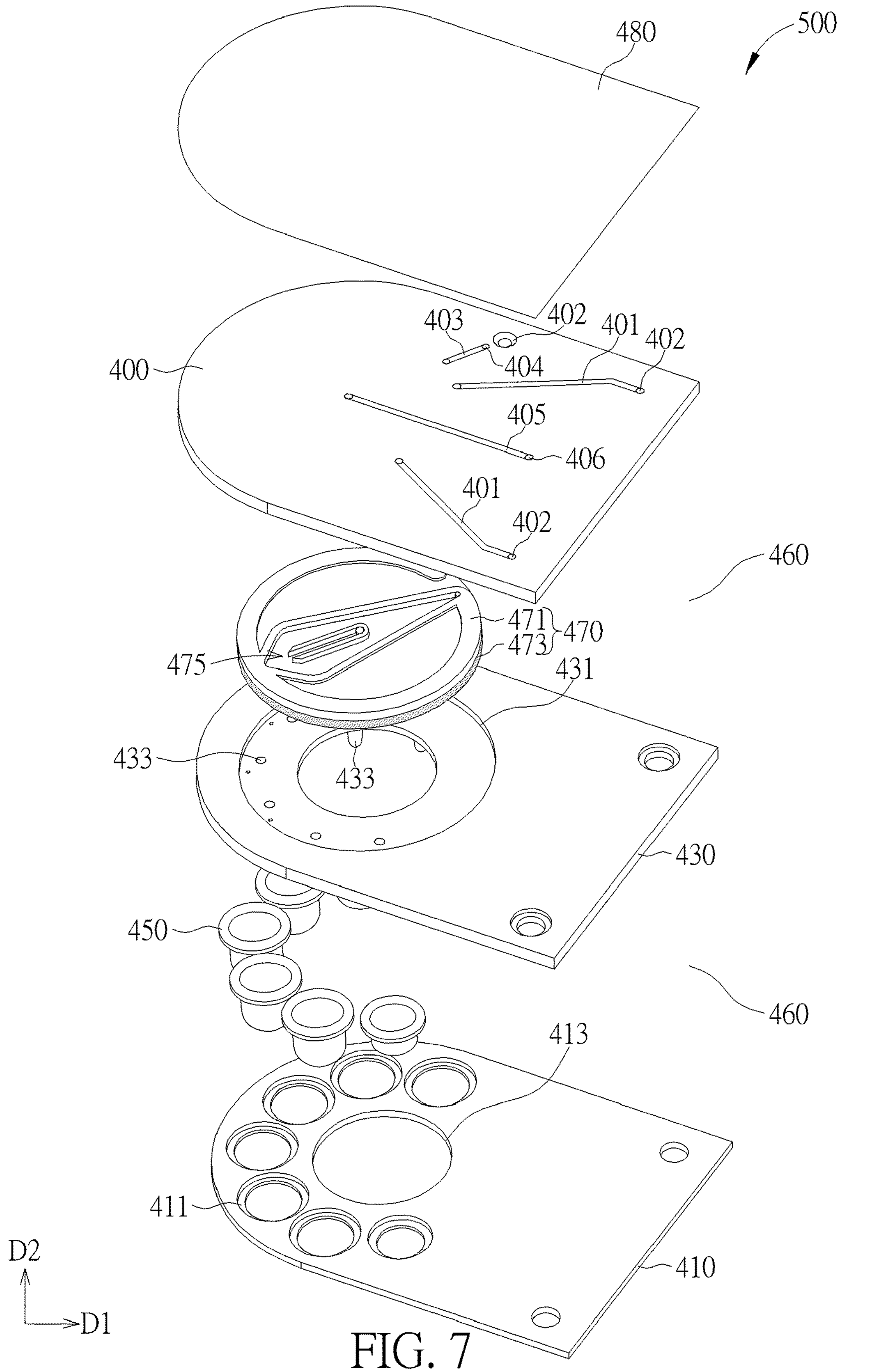
Figure 8:
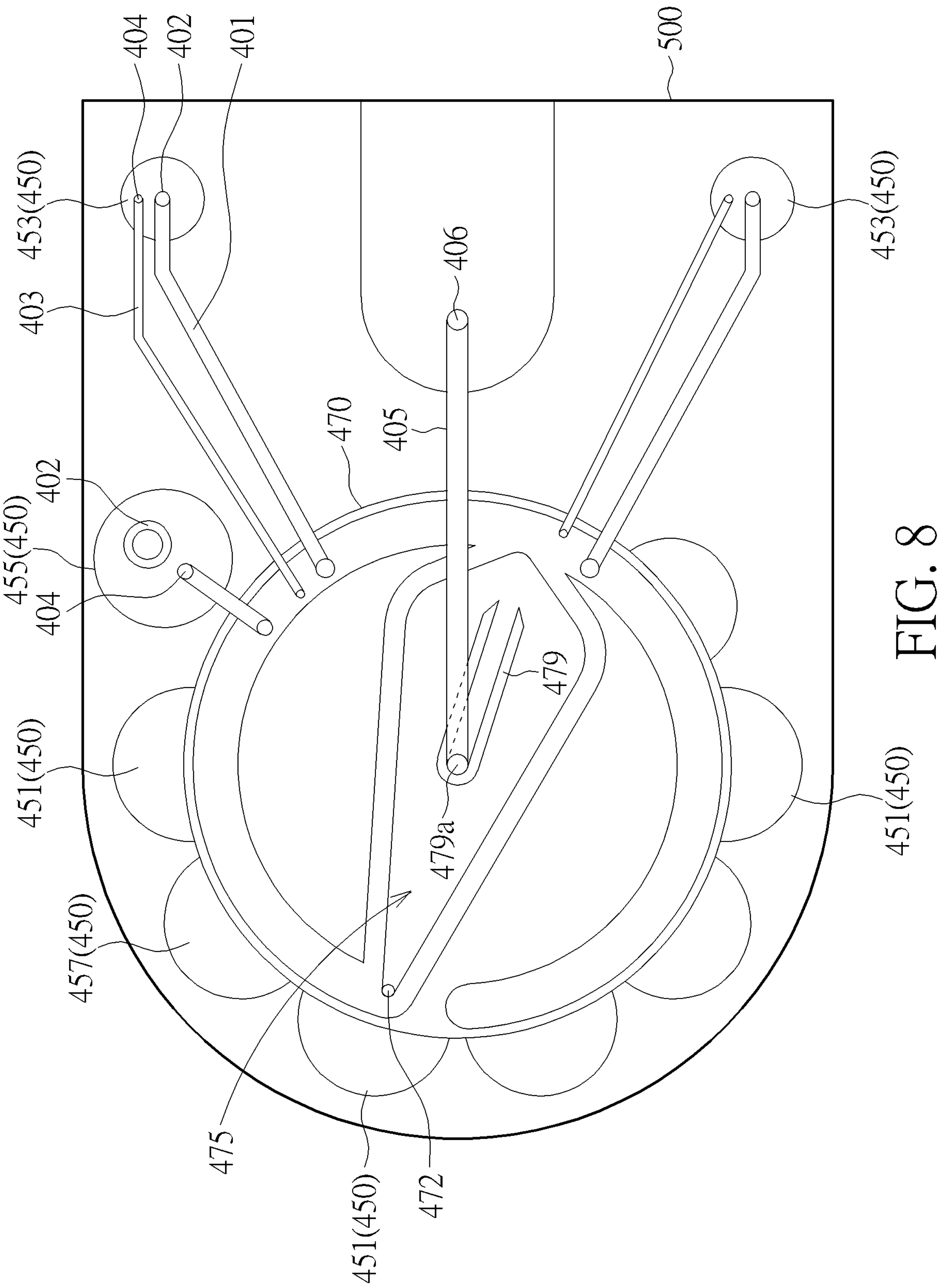

Please refers to FIGS. 7-10, which illustrate an analysis cartridge 500 according to the second embodiment of the present disclosure, wherein FIG. 7 is a schematic diagram of an exploded view of the analysis cartridge 500, FIG. 8 is a schematic diagram of a top view of the analysis cartridge 500, and the rest are schematic diagrams of a stereo view or a cross-sectional view of the detailed components of the analysis cartridge 500. As shown in FIG. 7 and FIG. 8, the analysis cartridge 500 also includes a first cover 400, a second cover 410, a sealing layer 480 and a rotary valve 470, and the first cover 400 and the second cover 410 are separately from each other before assembling, so as to together define an accommodation space 460 therebetween. The structure, material selection and the assembling method of the analysis cartridge 500 in the present embodiment are all substantially the same as those of the analysis cartridge 300 in the first embodiment, and which will not be redundantly described hereinafter. The differences between the present embodiment and the first embodiment lie in that a third cover 430 is additionally disposed between the first cover 400 and the second cover 410, and the rotary valve 470 is rotatably disposed on the third cover 430 and within the accommodation space 460 between the first cover 400 and the second cover 410. The first cover 400, the third cover 430 and the second cover 410 are assembled through a thermal melting method or an ultrasonic method, so as to sandwich the rotary valve 470 between the first cover 400 and the third cover 430 (as shown in FIG. 8), thereby improving the reliability and malleability of the analysis cartridge 500.

Precisely speaking, the first cover 400 and the second cover 410 also include mutually corresponding contours, such as the arch shape as shown in FIGS. 7-8, but are not limited thereto. The first cover 400 further includes a plurality of fluid tunnels 401 and a plurality of gas tunnels 403 disposed thereon, wherein each of the fluid tunnels 401 and each of the gas tunnels 403 for example horizontally extend in any direction parallel to the direction D1 to connect to a pipette 402 or an gas hole 404, for fluid or gas circulation. On the other hand, the second cover 410 further includes a plurality of through holes 411 disposed thereon, and the through holes 411 may penetrate through the second cover 410 to accommodate a plurality of containers 450. In the present embodiment, although the sizes of each container 450 and each through hole 411 (for example, the diameter or the aperture of the container 450 and the through hole 411) are uniform, the practical arrangement is not limited thereto. In another embodiment, the arrangement of the through holes and the containers may also optionally include various sizes as reference to the through holes 111, 113, 115 and the containers 151, 153, 155 in the first embodiment. The containers 450 for example include a plurality of reagent container 451, at least one reaction container 453 and a least one sample container 455, wherein each of the reagent containers 451 may accommodate a cleaning reagent, a buffer, an eluent, a lysis buffer or the like, the at least one reaction container 453 may accommodate various enzymes or reactants (such as primers or probes) for performing the reaction, and the at least one sample container 455 may accommodate various samples such as bacteria, cells or virus or the samples suspected to contain bacteria, cells or viruses for performing the nucleic acid extraction and the nucleic acid amplification. Also, the containers 450 may further include an extraction container 457 having a plurality of magnetic beads (not shown in the drawings) disposed therein, and the magnetic beads may be combined with the testing sample for purification at the beginning of the test. In addition, it is noted that, the detailed features (such as the material selections, the structures or the arrangements) of the first cover 400, the second cover 410 and other components (such as the fluid tunnels 401, the pipettes 402, the gas tunnels 403, the gas holes 404, the containers 450 and the flat film material attached on the surface of the first cover 400) are all substantially the same as those in the first embodiment, and which will not be redundantly described hereinafter.

Figure 9:
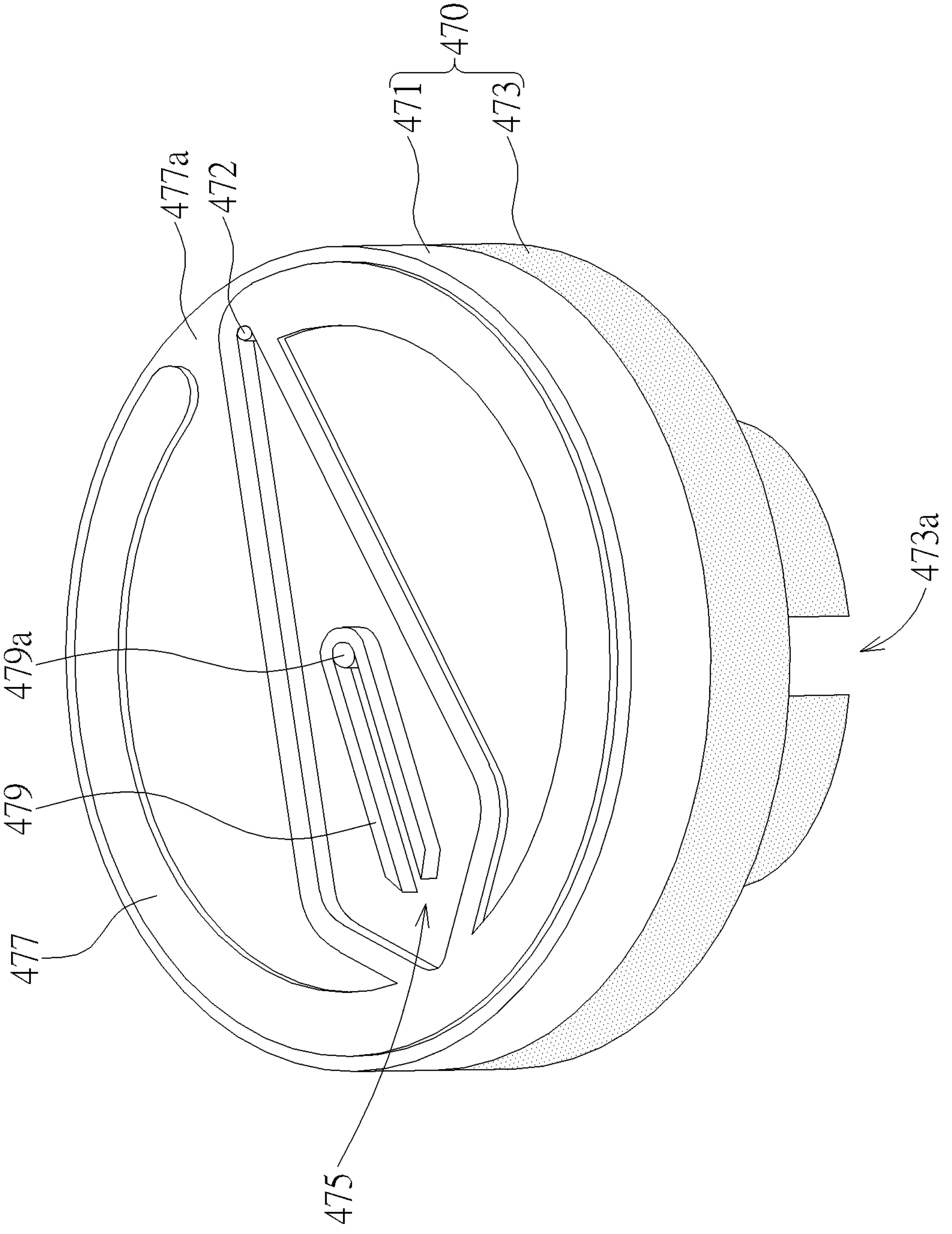

The rotary valve 470 of the present embodiment is also consisted of a soft material in combined with a hard material, in order to improve the airtightness of the rotary valve 470 after being combined with the first cover 400, the third cover 430 and the second cover 410. As shown in FIG. 9, the rotary valve 470 includes a first portion 471 and a second portion 473 stacked from top to bottom, wherein the second portion 473 for example includes a rigid material which is different from that of the first portion 471. The specific materials of the first portion 471 and the second portion 473 are substantially the same as those of the first portion 131 and the second portion 133 in the first embodiment, and it will not be redundantly described hereinafter. The first portion 471 further includes a protrusion 477, which surrounds the top surface of the first portion 471 to form a flow channel 475 and an opening 477*a*, and the second portion 473 of the rotary valve 470 includes an engagement 473*a*. In this way, after the analysis cartridge 500 is assembled, the first portion 471 of the rotary valve 470 may also attach to the first cover 400, and the second portion 473 of the rotary valve 470 may be protruded into the through hole 413, thereby achieving an airtight assemble manner. With such arrangement, the engagement 473*a* of the second portion 473 of the rotary valve 470 may externally connect to a motor (not shown in the drawings), with the motor driving and controlling the rotary valve 470 within the analysis cartridge 500 to rotate.

Figure 10:
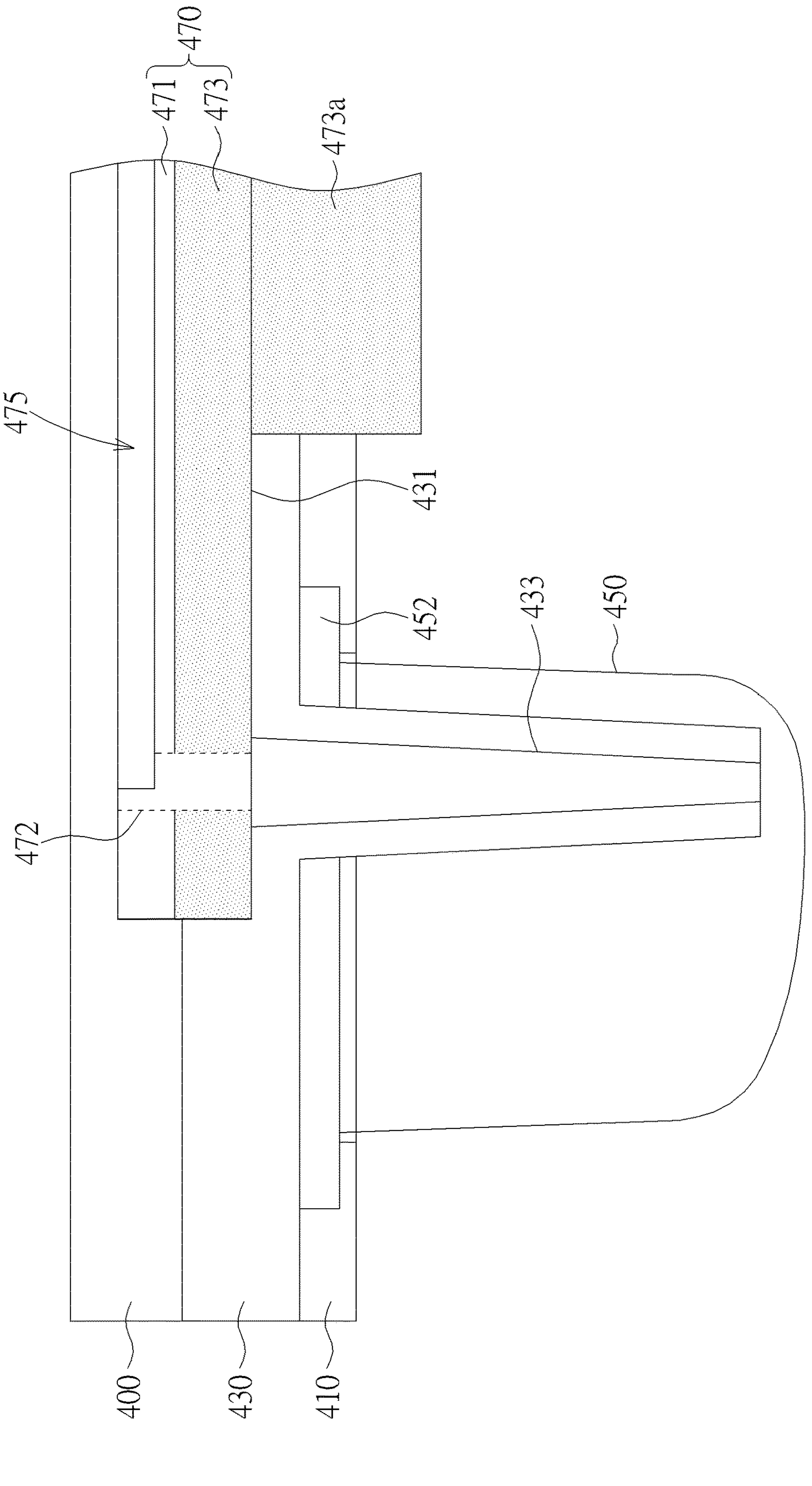

The difference between the present embodiment and the aforementioned embodiments is mainly in that the coverage area of the rotary valve 470 is greater than that of the rotary valve 130 in the aforementioned embodiments. For example, while observing a top view shown in FIG. 8, the rotary valve 470 may partially cover a part of the containers 450 disposed below, and in comparison, the rotary valve 130 in the aforementioned embodiment will not cover any container 150 (as shown in FIG. 2). Please also refer to FIG. 7 and FIG. 10, the rotary valve 470 is disposed on a base 431 of the third cover 430, and the coverage area of the base 431 may also partially cover a part of the containers 450. Furthermore, a plurality of pipettes 433 are disposed below the base 431, and each pipette 433 is in alignment with each container 450 underneath. While the analysis cartridge 500 is assembled, each of the pipettes 433 may penetrate through a film 452 on each container 450 to extend into each container 450. Precisely speaking, each of the pipettes 433 includes a hollow structure which is extended downwardly from the third cover 430 and protruded from a surface of the third cover 430. In the present embodiment, although the bottom of each pipette 433 is illustrated as a plane as shown in FIG. 10, the practical arrangement is not limited thereto. In another embodiment, the bottom of the pipettes may include an inclined sidewall as reference to the pipettes 102 of the aforementioned embodiments, so as to improve the problem that the pipettes are easy to remain in the pipettes when sucking liquid.

On the other hand, due to the expanded coverage area of the rotary valve 470, the flow channel 475 disposed on the rotary valve 470 may also have a larger volume accordingly, so as to accommodate more fluid. The flow channel 475 may include any suitable shape, such as a spindle shape as shown in FIG. 9, but is not limited thereto. It is noted that, the rotary valve 470 further includes a vertical channel 472 disposed thereon, and the vertical channel 472 penetrates through the first portion 471 and the second portion 473 of the rotary valve 470 to communicate with the flow channel 475 (as shown in FIGS. 9-10). With such arrangements, the vertical channel 472 is allowable to be connected with each of the pipettes 433 in sequence by the rotation of the rotary valve 470. Then, while the rotary valve 470 is externally connected with a pump (not shown in the drawings) through its engagement 473*a*, various reagents within each container 450 may be sucked out, discharged, or transferred through a positive or a negative pressure supplied by the pump. Furthermore, in the present embodiment, the first portion 471 of the rotary valve 470 further includes a protruding ring 479 disposed around an air hole 479*a*. While the rotary valve 470 is used to suck out, discharge, or transfer various reagents through the assist of the pump, the air hole 479*a* disposed on the rotary valve 470 may be connected to a vent 406 through an air-guided channel 405 additionally disposed on the first cover 400, so that, the various reagents may be fluently sucked out, discharged, or transferred.

Through these arrangements, the analysis cartridge 500 of the second embodiment in the present disclosure is provided. The analysis cartridge 500 may also freely transfer and mix the various fluids such as the samples, the reagents and the reactants within the containers 450 by using the rotary valve 470 disposed within the analysis cartridge 500, to carry out the detection reaction in the reaction container 453 finally. In this way, the analysis cartridge 500 may effectively provide an automated testing process of sample-in result-out. In the present embodiment, the coverage area of the rotary valve 470 is expanded, so that the rotary valve 470 may enable to partially cover the containers 450 underneath, and the flow channel 475 of the rotary valve 470 may also have an expanded volume correspondingly. Accordingly, while the external motor is linked with the rotary valve 470 disposed within the analysis cartridge 500 to drive the rotary valve 470 to rotate, the vertical channel 472 disposed on the rotary valve 470 may be directly aligned and communicated with the pipettes 433 penetrated into the containers 450, and the fluids may be sucked out and temporarily stored in the flow channel 475. Therefore, the fluid circulation path may be shortened, and the required time for the fluid to be sucked out, discharged or transferred may also be reduced significantly. Also, with these arrangements, the analysis cartridge 500 in the present embodiment may also obtain the simplified component configuration, in which, not only the liquid temporary storage region 170 of the aforementioned embodiments may be omitted, but also the specific number of the fluid tunnels 401 and/or the gas tunnels 403 disposed on the first cover 400 may be dramatically reduced. Thus, in comparison with the analysis cartridge 300 in the aforementioned embodiments, the analysis cartridge 500 may therefore gain more optimized testing efficiency and more simplified configuration, so as to meet the practical requirements of the testing products.

In summary, the present disclosure provides an analysis cartridge, which is assembled by two or more than two covers via a thermal melting method or an ultrasonic method. The analysis cartridge includes the rotary valve which is rotatably disposed therein, with the rotary valve being rotated by being linked with an external motor to form the fluid circulation paths like a "container-fluid tunnel-flow channel on the rotary valve-fluid tunnel-container" path, a "container-fluid tunnel-flow channel on the rotary valve-liquid temporary storage region-fluid tunnel-container" path, or a "container-vertical channel on the rotary valve-flow channel on the rotary valve-container" path. Therefore, the various reagents within each container in the analysis cartridge may be successfully sucked out, discharged, transferred, and mixed through a positive pressure or a negative pressure supplied by the pump, and finally to carry out a predetermined detection reaction such as a nucleic acid amplification, a probe binding reaction or an enzyme binding reaction in a reaction container. Then, the analysis cartridge of the present disclosure may achieve an automated testing process of sample-in result-out. Besides, people in the art should fully understand that, the analysis cartridge not only may be used in nucleic acid extraction and nucleic acid testing, but also may be further in used in other testing fields based on practical requirements. For example, in other embodiments, the analysis cartridge of the present disclosure may also be used in protein sample extraction and enzyme immune reaction.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An analysis cartridge, comprising;

a first cover;

a second cover, attached to the first cover, the second cover comprising two opposite surfaces and a plurality of first through holes and one second through hole disposed thereon, the first through holes and the second through hole individually penetrating through the two surfaces;

a plurality of containers, sandwiched between the first cover and the second cover, the containers individually being in alignment with the first through holes;

a plurality of fluid tunnels disposed on the first cover, each of the fluid tunnels being connected to a first pipette;

a plurality of gas tunnels disposed on the first cover, wherein each of the gas tunnels has a gas hole aligned with and extended into each of the containers; and a rotary valve, rotatably disposed between the first cover and the second cover to in alignment with the second through hole, the rotary valve comprising a flow channel disposed thereon to connect to the containers individually.

2. The analysis cartridge according to claim 1, wherein the rotary valve comprises a first portion and a second portion made of different materials, the first portion comprises a protrusion disposed thereon to surround the flow channel.

3. The analysis cartridge according to claim 2, wherein the second portion of the rotary valve is installed in the second through hole.

4. The analysis cartridge according to claim 1, wherein the flow channel comprises a spindle shape or a straight shape.

5. The analysis cartridge according to claim 1, wherein the flow channel further connects to a liquid temporary storage region disposed on the first cover.

6. The analysis cartridge according to claim 5, wherein the flow channel is connected to the containers via the fluid tunnels, and the fluid tunnels are disposed on the first cover along a horizontal direction.

7. The analysis cartridge according to claim 1, wherein the flow channel is connected to the containers via a vertical channel disposed on the rotary valve.

8. The analysis cartridge according to claim 1, wherein the first pipette extends downwardly from a first surface of the first cover to protrude from a second surface of the first cover.

9. The analysis cartridge according to claim 1, wherein the first pipette comprises an inclined sidewall at a bottom portion thereof.

10. The analysis cartridge according to claim 1, wherein the rotary valve partially covers a part of the containers in a vertical direction.

11. The analysis cartridge according to claim 1, further comprising a third cover sandwiched between the first cover and the second cover, wherein the rotary valve is disposed on the third cover.

12. The analysis cartridge according to claim 11, further comprising a plurality of second pipettes disposed on the third cover, wherein the second pipettes are in alignment with the first through holes respectively.

13. The analysis cartridge according to claim 1, wherein the containers comprise a sample container, a reaction container and a reagent container.

14. The analysis cartridge according to claim 1, wherein each of the containers comprises an inclined portion disposed at least in a bottom of each of the containers.

15. The analysis cartridge according to claim 14, wherein the inclined portion comprises an inclined sidewall.

16. The analysis cartridge according to claim 1, wherein each of the containers further comprises a main body and a film to seal the main body.

17. The analysis cartridge according to claim 1, wherein one of the containers further comprises a plurality of magnetic beads.

* * * * *